US010598307B2

(12) United States Patent
Long

(10) Patent No.: US 10,598,307 B2
(45) Date of Patent: Mar. 24, 2020

(54) SYSTEMS, DEVICES, AND/OR METHODS FOR IMPROVED MATERIAL EFFICIENCY AND FABRICATION OF MODULAR PIPELINE PIGS

(71) Applicant: Danton S. Long, Wheeling, WV (US)

(72) Inventor: Danton S. Long, Wheeling, WV (US)

( * ) Notice: Subject to any disclaimer, the term of this patent is extended or adjusted under 35 U.S.C. 154(b) by 194 days.

(21) Appl. No.: 15/721,941

(22) Filed: Oct. 1, 2017

(65) Prior Publication Data

US 2018/0209574 A1    Jul. 26, 2018

Related U.S. Application Data

(63) Continuation-in-part of application No. 15/411,860, filed on Jan. 20, 2017.

(51) Int. Cl.
*F16L 55/40* (2006.01)
*B08B 9/055* (2006.01)

(52) U.S. Cl.
CPC ............ *F16L 55/40* (2013.01); *B08B 9/0553* (2013.01); *B08B 9/0557* (2013.01)

(58) Field of Classification Search
CPC ... B08B 9/0553; B08B 9/0557; B08B 9/0551; F16L 55/40
See application file for complete search history.

(56) References Cited

U.S. PATENT DOCUMENTS

| | | | | |
|---|---|---|---|---|
| 4,378,838 A | * | 4/1983 | Ogden | E21B 33/16 166/153 |
| 4,907,314 A | * | 3/1990 | Kershaw | B08B 9/0557 15/104.061 |
| 6,067,682 A | * | 5/2000 | Rankin | B08B 9/0557 15/104.061 |
| 8,998,225 B2 | * | 4/2015 | Magee | A63C 17/012 280/87.042 |
| 2015/0330551 A1 | * | 11/2015 | Van Nie | G01N 29/225 138/98 |
| 2016/0334297 A1 | * | 11/2016 | Pirner | F16L 55/26 |

FOREIGN PATENT DOCUMENTS

CN       103977994 A   * 11/2015

* cited by examiner

*Primary Examiner* — Shay Karls
(74) *Attorney, Agent, or Firm* — Dale Jensen, PLC; Dale Jensen

(57) ABSTRACT

Certain exemplary embodiments comprise a seal assembly, a mandrel, a front module, and/or a rear module. At least one of the front module and the rear module comprises a mount hub, a seal assembly, a chassis, and/or a mount plate. Various annular sealing assemblies can be mounted and dismounted to and from the mount hub. The mount hub can provide substantial central support for the sealing system. The chassis can be constructed to couple the mount hub to the seal element. The mount plate can be constructed to couple the module to the mandrel. The modular pipeline pig is substantially modular. Certain exemplary embodiments provide for relatively rapid mounting and dismounting of elements to and from the module assembly. In practice, such embodiments allow for quickly and easily configuring a pigging system for many different applications.

19 Claims, 19 Drawing Sheets

SECTION A-A

SECTION B-B

SYSTEMS, DEVICES, AND/OR METHODS FOR IMPROVED MATERIAL EFFICIENCY AND FABRICATION OF MODULAR PIPELINE PIGS

CROSS-REFERENCES TO RELATED APPLICATIONS

This application is a continuation-in-part of, and incorporates by reference herein in its entirety, pending U.S. patent application Ser. No. 15/411,860, filed Jan. 20, 2017.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

and

Figure 33:
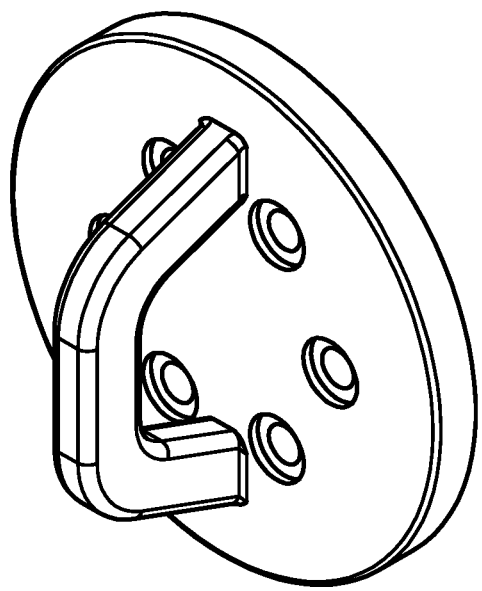
Figure 34:
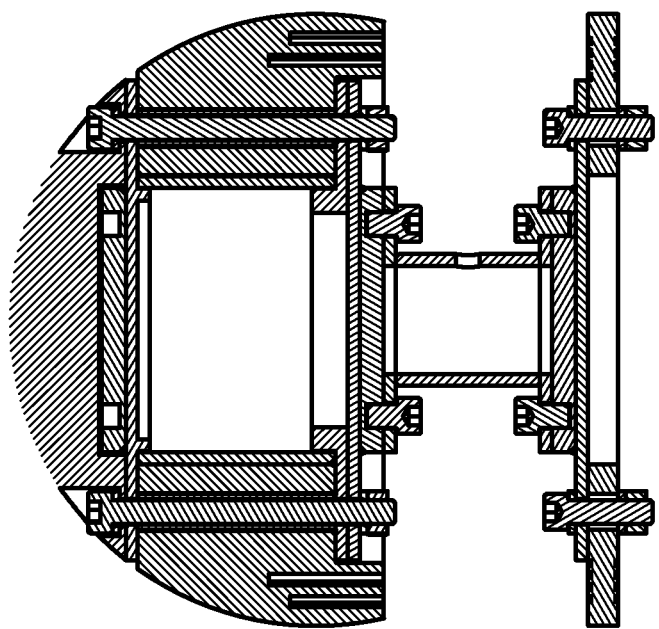
Figure 35:
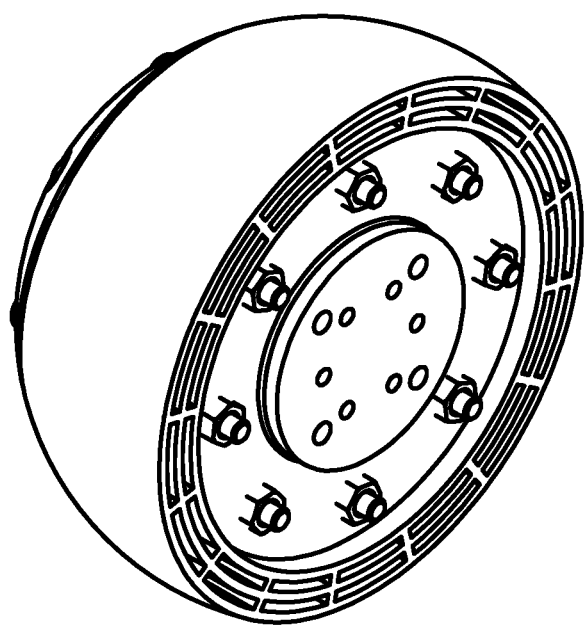

FIG. 33 is a perspective view of an exemplary embodiment of a lift lug;

FIG. 34 is a perspective view of an exemplary embodiment of an improved polyurethane elastomer partially spherical sealing element; and FIG. 35 is a perspective view of an exemplary embodiment of an improved polyurethane elastomer partially spherical sealing element.

DETAILED DESCRIPTION

Certain exemplary embodiments provide for improved material efficiency and fabrication of modular pipeline pigs. Certain exemplary embodiments provide a mechanism by which a seal assembly can be constructed with considerably less material to achieve the same functionality and performance of a typical pigging system. The mechanism further provides for rapid mounting and dismounting of said elements to and from the module assembly. In practice, such embodiments allow for quickly and easily configuring a pigging system for many different applications.

Certain exemplary embodiments comprise a seal assembly, a mandrel, a front module, and/or a rear module. At least one of the front module and the rear module comprises a mount hub, a seal assembly, a chassis, and/or a mount plate. Various annular sealing assemblies can be mounted and dismounted to and from the mount hub. The mount hub can provide substantial central support for the sealing system. The chassis can be constructed to couple the mount hub to the seal element. The mount plate can be constructed to couple the module to the mandrel. The modular pipeline pig comprises an installed set of substantially modular components.

Pipeline infrastructures have been constructed worldwide to facilitate the transportation of hydrocarbons in the petroleum and natural gas industries. Over time, debris can deposit in the pipeline and/or residual waste (e.g., scale, wax such as paraffin, and/or hydrates) can accumulate. This buildup can seriously affect pipeline efficiency and flow rates. For effective operations, pipelines must be cleaned to reduce risks and/or flow degradation. Proper cleaning and inspection can be important to safe and reliable pipeline operations. This can be done using a special device called a Pipeline Inspection Gauge ("PIG"), or conventional pig, which is often referred to as a Utility Pig.

Pigging (i.e., pipeline cleaning and/or inspection) is a common industry practice to deal with these emerging challenges throughout the service life of the pipeline to ensure pipeline integrity. Pigging is also a widespread practice during the construction phase in preparation for commissioning. Furthermore, it has become a widespread practice in many different industries. In municipalities, pigging is often used to maintain water distribution lines in water systems, including the distribution systems that connect sewer lines and fire hydrants. It is also used extensively to clean piping in many fluid handling operations and process industries such as food, dairy, beverage, biotech, soap, etc.

This growing demand for efficiency illustrates the need to manage challenging pipeline environments effectively. It also illustrates the need for robust and dependable pipeline pigging systems.

Pipeline pigging refers to the practice of using a device known as a "pig" to perform various maintenance operations. This is done without stopping the flow of the product in the pipeline. A "pig" is a tool that is sent down a pipeline and propelled by the pressure of the product flow in the pipeline itself.

In maintenance operations, a pig is launched into the pipe without stopping the flow of product (gas or liquid) in the pipeline. The pig is then propelled through the pipe by the pressure of fluid flow in the pipe itself. Utilization of pigging is common in:

The physical separation of fluids flowing through the pipeline for batch processing where more than one substance (e.g., hydrocarbons) is transported through the pipeline. Product pipelines may sequentially transport gasoline, diesel fuel, fuel oils, or other products, which are separated by batch pigs.

The internal cleaning of pipe (e.g., to remove solids, scale, wax buildup such as paraffin, and/or other debris from the pipe wall) to keep the pipeline flowing efficiently. Multiphase pipelines must be pigged frequently to limit liquid holdup and minimize the slug volumes of liquids that can be generated by the system.

To manage liquid accumulation and keep the pipeline free of liquid buildup in a wet gas system. Water and natural gas liquids can condense out of the gas stream as it cools and contacts the pipe wall in low places. This affects flow efficiency and creates corrosion issues.

Commissioning of newly constructed pipelines i.e., to remove any construction debris and/or scale left in the line from construction.

Thus, potential uses for pigs comprise:

Physical separation between different fluids flowing through the pipeline. Pigs are used in product pipelines to physically separate, or "batch" the variety of hydrocarbons that are transported through the line. Product pipelines may simultaneously transport gasoline, diesel fuel, fuel oils, and other products, which are kept separated by batching pigs.

Internal cleaning of pipelines. Operations may conduct pigging on a regular basis to clean solids, scale, wax buildup (paraffin), and other debris from the pipe wall to keep the pipeline flow efficiency high. In addition to general cleaning, natural-gas pipelines use pigs to manage liquid accumulation to help keep the pipe free of liquids. Water and natural gas liquids can condense out of the gas stream as it cools and contacts the pipe wall and pocket in low places, which affects flow efficiency and can lead to enhanced corrosion.

Prevention of solid accumulation and corrosion. Crude-oil pipelines are sometimes pigged to keep water and solids from accumulating in low spots and creating corrosion cells. This can be especially important when flow velocities are less than 3 ft/sec. Multiphase pipelines may have to be pigged frequently to limit liquid holdup and minimize the slug volumes of liquid, which can be generated by the system.

A pig is put into the line to perform a certain scope of work, and the measure of success is more than just getting the pig to travel from one end of the line to the other. A pig design should be able to:

negotiate a pipeline without excessive nose down or wear of seals, and no metal contact with the pipe wall;

maintain a positive seal with pipe wall at all times;

negotiate bends, with a positive seal, and avoid metal contact with pipe wall;

provide adequate bumper nose protection front and rear to avoid metal to metal contact problems as the pig traverses the line; and/or avoid through body and bolt hole leakage.

A Bi-Directional Pig is a displacement type utility pig used to displace water, liquids, or air in a pipeline. It offers excellent batching qualities, and it can run in either direction within the pipeline. Certain exemplary configurations can be derived from a series of independent parts that allow for multiple configurations and replacement of individual parts.

Bi-Directional Pigs can comprise two or more replaceable discs, and options for scraping discs, or wire brushes. In certain exemplary embodiments, a Bi-Directional Pig can be assembled comprising the following components:

a mandrel, which can comprise a steel body; the mandrel often comprises a main body tube, two steel retaining flanges (one for each end), and nuts and bolts for assembly;

two guides, such as polyurethane discs on the ends; an outside diameter of each guide is very near the inside diameter of the pipeline, and they are extra-thick because they take the brunt of most impacts while traveling down the line;

four seals, such as four middle polyurethane discs; the outside diameter is in close tolerance with an inside diameter of the pipeline. The purpose of the four seals is to maintain a good seal with the pipeline, to ensure that the pig is propelled efficiently and that a good fluid interface is maintained; and six spacers, which can be small discs between the guides and seals to space out the different discs so that they function separately.

The advantage of a mandrel pig design is that it can be dressed for cleaning or sealing, or a combination of both. The seals, cups, and brushes can be replaced to make the pig reusable. Disadvantages with certain pig designs can comprise:

the cost associated with redressing a pig when the seal elements (disc, cup, etc.) reach the end of their useful service life;

the excessive amount of waste material used in construction; and/or the use of a cylindrical body design where less than approximately 5% of the material used in construction actually ever comes in contact the inside surface of the pipe wall.

The growing desire for greater efficiency and reduced waste has renewed interest in pigging systems with improved capabilities. Certain exemplary pipeline pig designs offer pipeline engineers a new tool for maintaining pipelines, bringing a new dimension to pipeline pigging, since it can easily be configured for cleaning, batching, and corrosion protection on both bidirectional and unidirectional platforms.

Certain pigs are designed for cleaning and batching. The cup design is derived from the hydraulic piston seal and aggressively scrapes the pipeline bore while maintaining a relatively good seal.

What sets certain exemplary pigs apart from other pigs is a unique sealing element designs. The idea is that a single molded seal assembly, and/or a modular seal system.

has the ability to work and provide an equivalent seal, if not superior, to the conventional approach that uses a series of substantially solid sealing discs. The benefits of this design, depending on the design variant chosen can comprise:

- to easily and inexpensively cast sealing elements into the desired shape, size, and configuration as a single body mold;
- to mitigate, or at least reduce, the amount of material used in the manufacture of sealing elements;
- to provide a novel anchoring system (anchor lugs) that securely support, strengthen, and attach the sealing element to the chassis;
- to attach and secure the chassis to the mount hub using a novel design.
- to deploy multiple uses and or combinations of bidirectional and unidirectional mandrel pig designs; and/or
- to offer a scalable platform for all pipeline diameters.

Certain exemplary embodiments comprise a sealing element having a design that:

- are formed via casting to have a profile that resembles other pig designs configured with a series of discs (e.g., guide discs, spacer discs, and/or sealing discs, etc.); and
- resembles other pig designs with significantly less material in construction and/or disposable components thereof.

Certain exemplary embodiments provide a single molded sealing element that works over a wide range of pipe diameters on both bidirectional and unidirectional pigging platforms, which can provide a robust and flexible pig design.

Certain exemplary embodiments provide a series of independent parts that comprise a modular seal system that works over a wide range of pipe diameters on both bidirectional and unidirectional pigging platforms, which can provide a robust and flexible pig design.

A bi-directional pig is designed to be used for the displacement of water, liquids, or air in a pipeline. Bi-directional disc/scraper pigs offer excellent high sealing qualities.

A pig comprising a brush is designed to remove debris and deposits from the pipeline wall.

Typical independent parts used in a pig construction comprise: sealing discs, guide discs, cleaning brushes (both circular and spring mounted), cups (conical or basic) bumper noses, spacer discs.

Pig movement though a pipe can:
- remove debris;
- allow for separated batch conveyance of liquids;
- rotate in some embodiments as it passes through a pipe; and/or
- be used in many different industries: oil and gas, wastewater treatment, fire hydrants, and/or plumbing, etc.

Certain exemplary embodiments can be constructed for:
- multiple use and/or combination of elements can be deployed: such as cleaning, brush, cup, batch, and/or magnetic, etc.;
- scalable design, which allows for construction for a wide variety of pipeline diameters;
- static design, sized so that molded elements performs specific function and purpose;
- compression design, which allows a cleaning element to contract or expand while moving through pipe;
- handles and lifting lug to facilitate lifting or positioning;
- nose design can comprise any of a variety of configurations, e.g., eye hook, cone, cup, sphere, disc, and/or guide wheels, etc.; and/or
- tail design can comprise any of a wide variety of design configurations, e.g., cone, disc, and/or inverted cup, etc.

Certain exemplary embodiments meet physical challenges for navigating and cleaning pipelines through an innovative modular design of segmented modules and an inter-module coupling system. Certain exemplary embodiments are capable of navigating pipelines of between approximately 4" and 48" in diameter.

Certain exemplary embodiments provide modular architecture, which provides tremendous flexibility and scalability. Certain mandrel pigs have a front (module) and a rear (module) seal element (guide disc, spacer disc, seal disc) attached to a pipe mandrel via flanged connections. Certain exemplary embodiments provide a modular approach, which supports a segmented platform with modules that can be added as needed, up to four, to construct a platform that is train-like in nature. Like a train, the platform includes cars (i.e., modules) that can be used for various purposes including the batching of liquids, liquid removal, cleaning, and/or sizing. The platform is also capable of travel within a pipe in both forward and/or reverse directions.

The modular platform approach has the advantage that modules can be added and/or removed as needed within certain constraints. The modules system architecture may be divided into four primary components consisting of a hub, which is "resident" to the module, a solid cast seal element or modular seal system that is an interchangeable component, a chassis that secures the mount hub and seal element in place, and a plate that allows the module to be attached to the inter-module coupling system. This aspect of design serves three purposes. First, it limits the number of components in design. Second, it limits the number of precision-machined parts and need for expensive castings. Third, it provides a system architecture that can incorporate numerous features to facilitate most pigging programs.

The platform also has several key advantages that simplify assembly. First, the platform is assembled using one or more module(s) and an inter-module coupling (pipe mandrel) system. This system greatly reduces architectural complexity and can expand the market for such devices. Second, it offers a highly adaptable and agile platform that is much simpler in design. It can easily be outfitted to carry with a wide variety of sealing elements (e.g., guide disc, seal disc, spacer, brush, cup, and/or sizing plate, etc.) or be dressed to perform as a bidirectional, unidirectional, or sphere pig.

Certain exemplary embodiments provide a solid cast seal element or modular interchangeable seal system. This capability is particularly useful because the pig can be dressed to perform a variety of pigging functions e.g., batching and/or liquid removal, etc. More importantly, the use of a resident hub design significantly reduces waste. The seal system(s) is cast with approximately 60% less material than a conventional pigging platform, because the center portion of the seal(s) has been replaced with a resident hub. This advantage alone will result in significantly lower capital and construction cost and achieve the same performance criteria. Although the current emphasis is to demonstrate a platform dressed in a bi-directional seal element, the seal could just as easily be cast to replicate a sphere, brush, or cup, etc. (hydraulic piston).

Certain exemplary embodiments provide an inter-module coupling system, which plays a role in keeping the platform intact and maximizing the number of design options for simple, safe, and reliable operation in the field. The inter-module coupling system between the modules will function as a physical connector to secure the modules in place, and to configure the platform for a particular task.

Based on research and design efforts completed (to date), our team is confident that the design is a fully developed system that will achieve anticipated benefits:
  A more versatile platform capable of performing a variety of duties.
  Significant cost savings from a reduction in waste.
  Efficient modular architecture.
  Solid cast polyurethane elastomer seal options.
  Modular polyurethane elastomer seal system options.
  Resident hub strengthening qualities.
  Minimal precision machining required.
  No expensive metal castings.
  Shelf item bolt connections.

Figure 1:
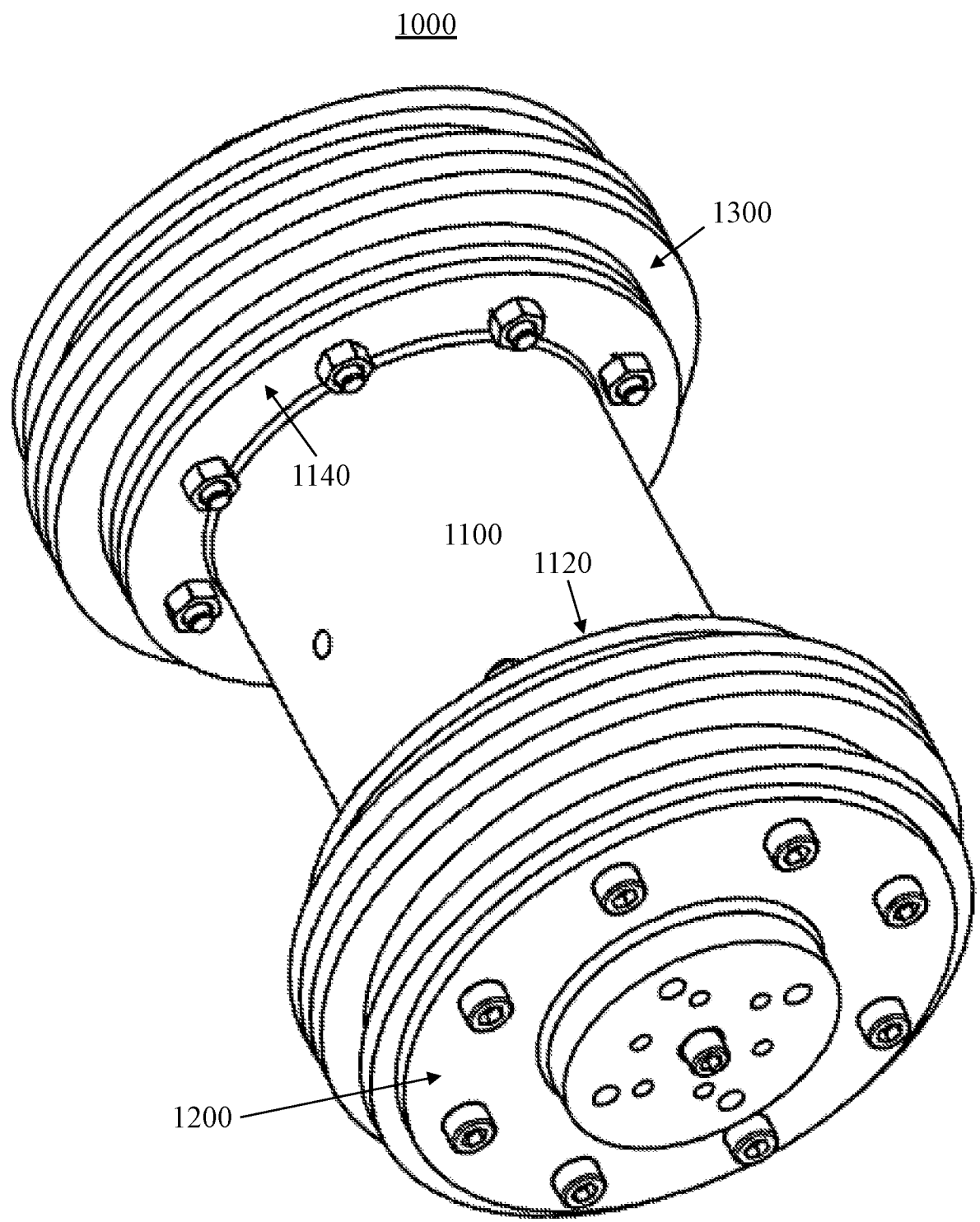
FIG. 1 is a perspective view of an exemplary embodiment of a bidirectional modular pipe pigging system 1000.

FIG. 1 is a perspective view of an exemplary embodiment of a bidirectional modular pipe pigging system 1000. The bidirectional platform shown in FIG. 1, replicates an exemplary bidirectional pig with a large pipe mandrel outfitted with a seal comprising two guide discs, four sealing discs, and six spacer discs. The guide disc centralizes the pig and supports its weight. The oversized seal discs scrape, seal, and clean the pipeline inner wall. The oversized seal discs also provide the seal utilized to propel the pig through the pipe.

Certain exemplary embodiments comprise bidirectional pipe pigging system 1000. The Pipe pig can comprise:
  a resilient seal assembly
  a mandrel 1100;
  a front module 1200; and/or
  a rear module 1300.

In certain exemplary embodiments, at least one of front module 1200 and rear module 1300 comprise a mount hub (see e.g., the mount hub of FIG. 15, or the mount hub of FIG. 17), a solid cast seal element (see e.g., the seal element of FIG. 11, or the modular seal system of FIG. 14), a first chassis (see e.g., the chassis of FIG. 8), and a second chassis (see e.g., the chassis of FIG. 16), and a mount plate (see e.g., the mount plate of FIG. 7), the chassis constructed to couple the mount hub to the seal element, the mount plate constructed to couple front module 1200 and/or rear module 1300 to mandrel 1100. The outer chassis (see e.g., the chassis of FIG. 8) is a machined metal disc that, when coupled to the solid cast seal element or a modular seal system (see e.g., the seal element of FIG. 10, and modular seal system 10400 of FIG. 14), substantially covers a face of the seal, and prevents the passage of fluid or gas. The chassis face (see e.g., the chassis of FIG. 8) can comprise a rest lip to support the hub (see e.g., the hub of FIG. 15) The chassis (see e.g., the chassis of FIG. 8) defines chassis apertures (see e.g., the chassis apertures illustrated in FIG. 8). The chassis is coupleable to the seal element via fasteners that pass through the chassis apertures.

A lift lug (see, e.g., the lift lug of FIG. 33) can be coupled to the pipe pig, wherein the pipe pig is liftable via the lift lug.

Figure 3:
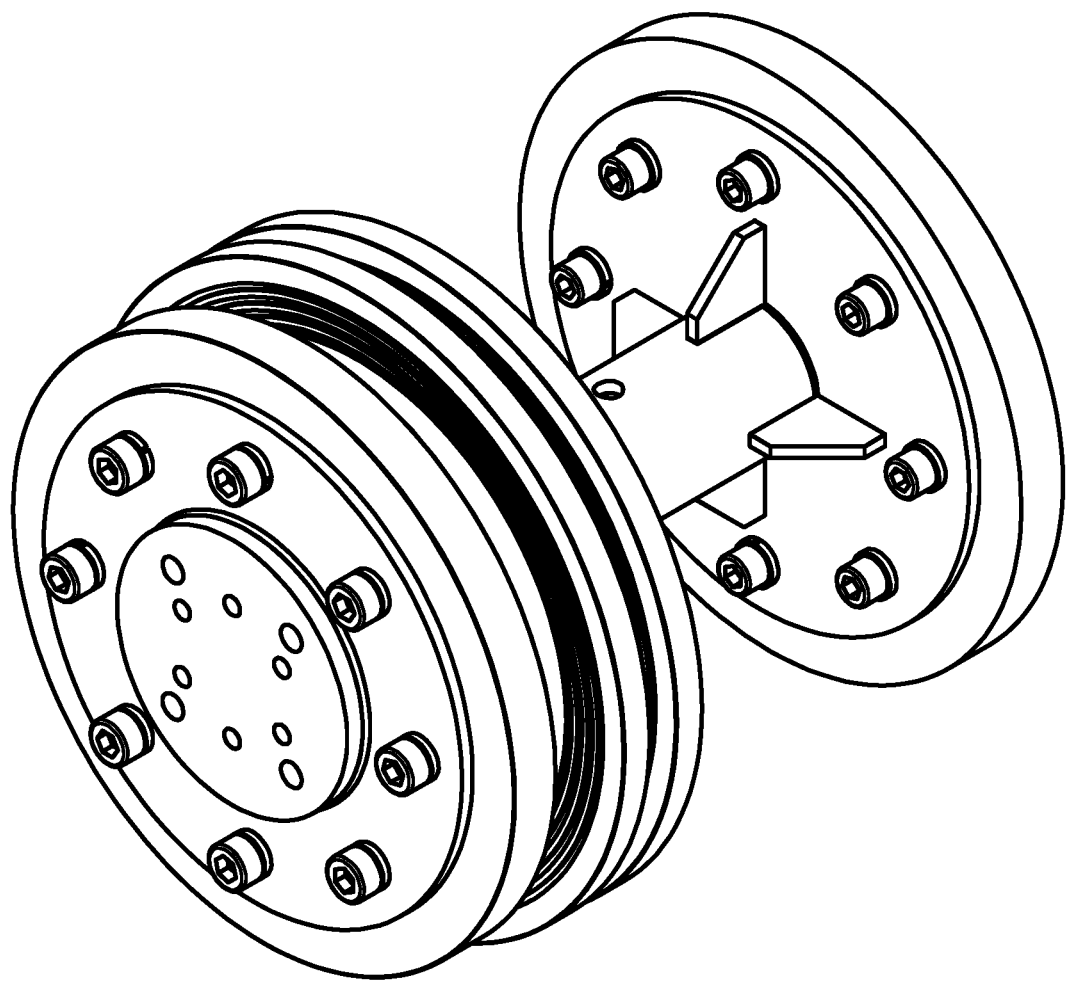
FIG. 3 is a perspective view of an exemplary embodiment of a unidirectional modular pipe pigging system.

In certain exemplary embodiments, one of the front module and the rear module comprises single guide disc (see, e.g., the single guide disc of FIG. 3).

Figure 31:
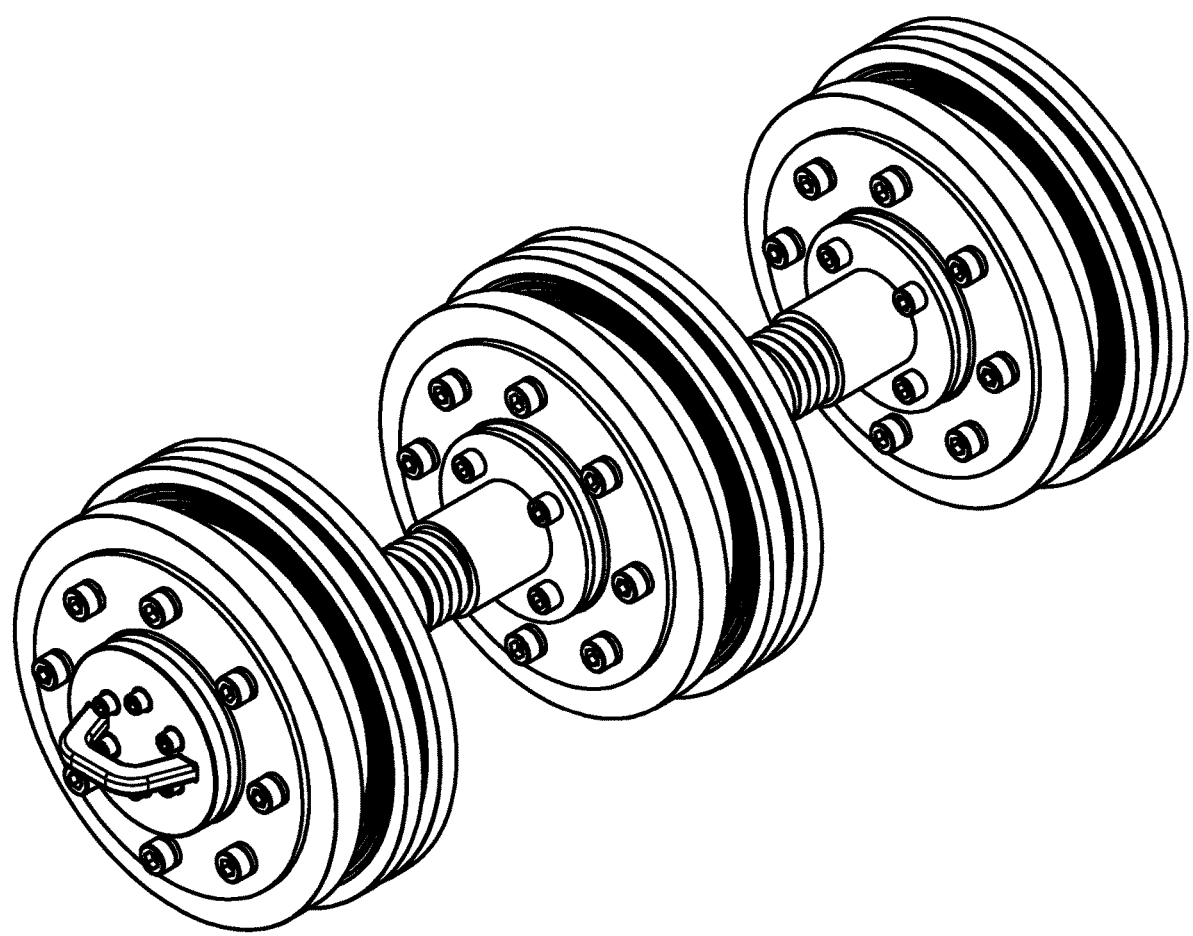
FIG. 31 is a perspective view of an exemplary embodiment of a unidirectional modular pipe pigging platform.

Mandrel 1100 can comprise a flexible central portion (see, e.g., the flexible central portion of FIG. 31), the flexible central portion coupled to a substantially rigid anterior portion (see, e.g., the substantially rigid anterior portion of FIG. 31) and a substantially rigid posterior portion (see, e.g., the substantially rigid posterior portion of FIG. 31).

Mandrel 1100 comprises a first flange 1120 and a second flange 1140. First flange 1120 is coupleable to front module 1200. Second flange 1140 is coupleable to rear module 1300.

Figure 7:
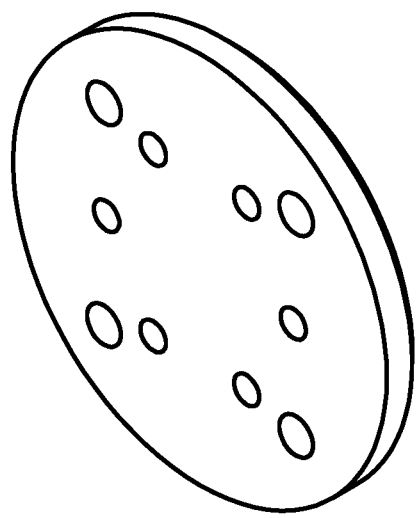
FIG. 7 is a perspective view of an exemplary embodiment of a mount plate.

The mount plate (see e.g., the mount plate of FIG. 8) is a machined disc that defines mount plate apertures (see e.g., the mount plate apertures of FIG. 7). The mount plate is coupleable to the chassis in many ways: it can be welded to a metal chassis, machined or molded from plastic, or connected via fasteners that pass through the mount plate apertures.

The solid cast seal element defines a central opening that is shaped to conform the hub. This shape can be of any design (see e.g., the seal element of FIG. 11, which has a central opening in the shape of a circle). The solid cast seal element can be coupled to the chassis via:
  one or more bolts;
  one or more bolts into a mold-in threaded insert;
  a cast housing and keeper; and/or
  one or more bolts and nuts.

The improved sealing disc is an independent part of the seal assembly. It has integral lip portions being separate and flexible with respect to each other and spaced apart with grooves.

The pig can be a unidirectional pig or a bidirectional pig.

Figure 2:
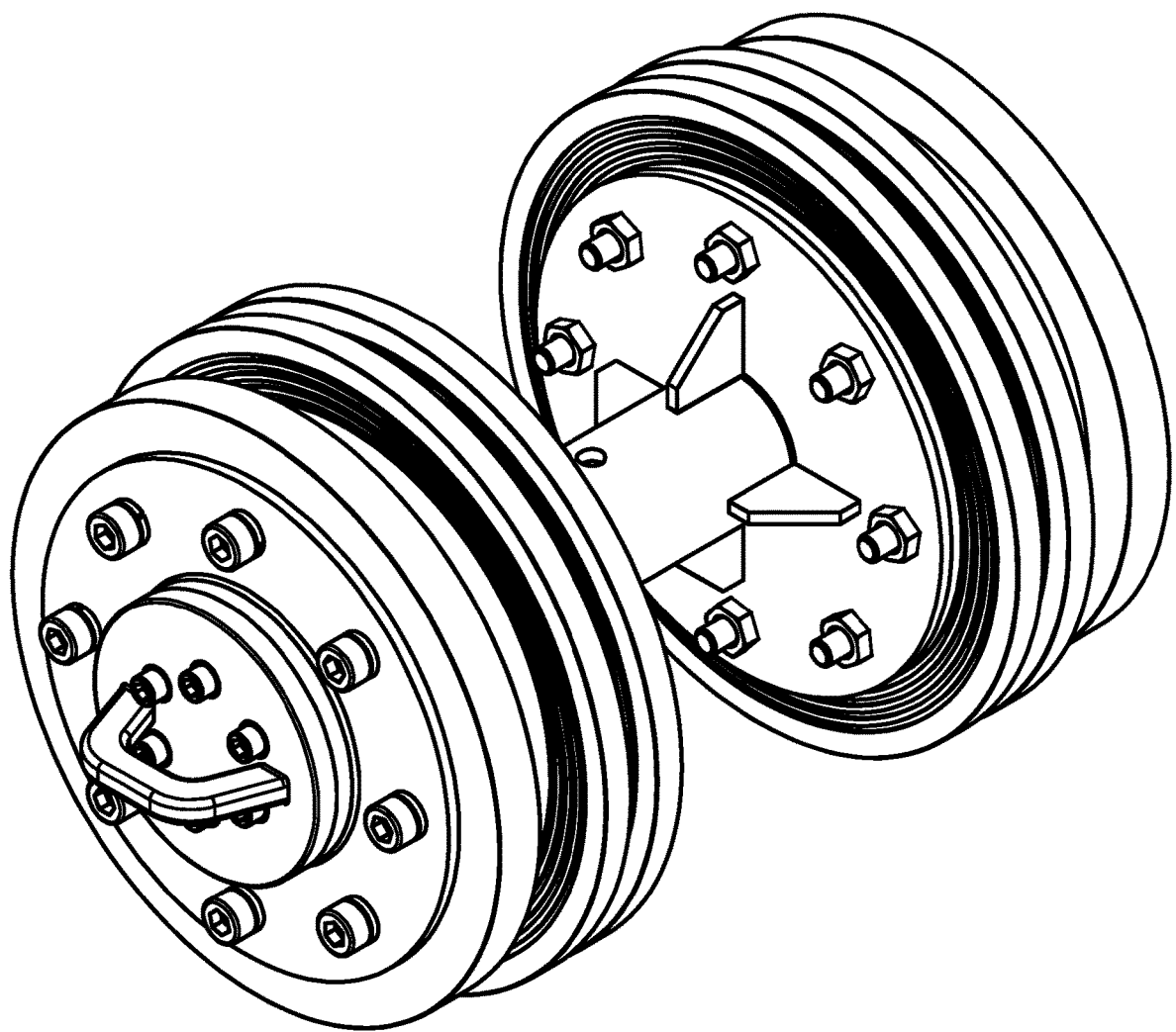
FIG. 2 is a perspective view of an exemplary embodiment of a bidirectional modular pipe pigging system.

FIG. 2 is a perspective view of an exemplary embodiment of a bidirectional modular pipe pigging system. The bidirectional platform shown in FIG. 2, replicates an exemplary bidirectional pig with a small pipe mandrel outfitted with a seal comprising two guide discs, four sealing discs, and six spacer discs.

FIG. 3 is a perspective view of an exemplary embodiment of a unidirectional modular pipe pigging system. The unidirectional platform shown in FIG. 3, comprises a seal configured with one guide disc, two sealing discs, and six spacer discs on the front module. The rear module is fitted with a single guide disc to stabilize the pig. The inter-module coupling length is shorter than approximately 1.5×diameter length used on certain exemplary pipe mandrels.

Figure 4:
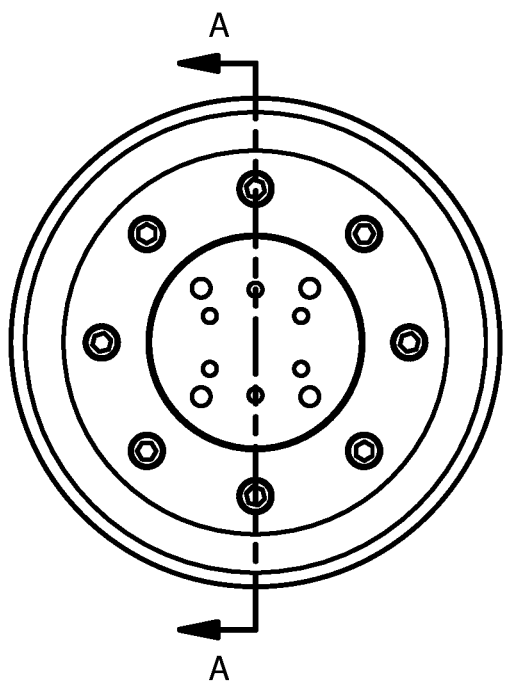
FIG. 4 is an end view of an exemplary embodiment of a modular pipe pigging system.
Figure 5:
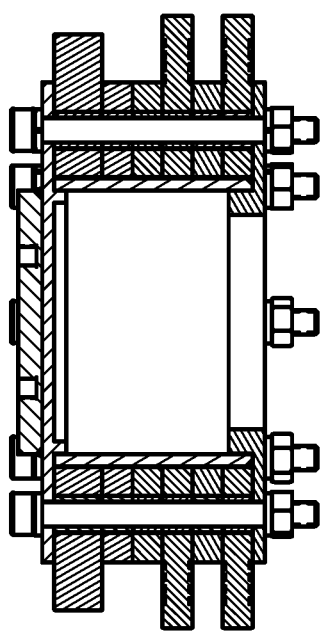
FIG. 5 is a section A-A of the end view of FIG. 4.
Figure 6:
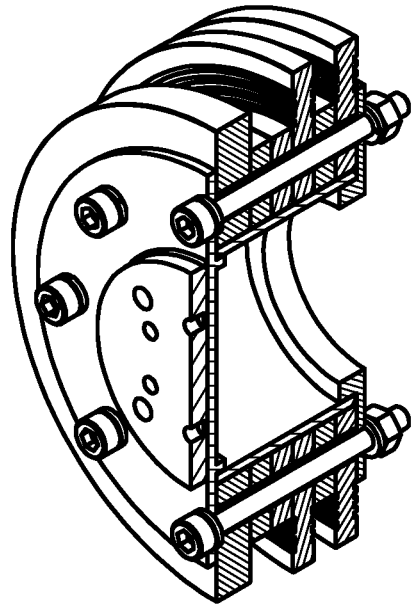
FIG. 6 is a perspective cut away view of the end view of FIG. 4.

FIG. 4 is an end view of an exemplary embodiment of a modular pipe pigging system. FIG. 5 is a section A-A of the end view of FIG. 4. FIG. 6 is a perspective cut away view of the end view of FIG. 4.

The module is the central part of the platform assembly. The module seal assembly can be configured as a cleaning pig, batch pig, brush pig, sphere pig, displacement pig, sealing pig, or a combination of all on either a bidirectional or unidirectional platform.

The module can be divided into primary components comprising:
  a first chassis flange;
  a mount hub mounted to the face of the first chassis flange;
  a resilient seal assembly coupled to the mount hub;
  a second chassis flange constructed to couple and position the mount hub and resilient seal assembly between the first and second chassis flanges; and/or
  a mount plate constructed to couple the front module or the rear module to the mandrel.

The mount hub, which is "resident" to the module, the seal assembly that is an interchangeable component which mounts to and from the mount hub, a second chassis flange that secures the mount hub and seal element in place, and the mount plate that allows the module to be attached to the inter-module coupling system. These components are assembled with bolts.

Section A-A is a detailed sectional view of the module with a bidirectional seal element. The crosshatched areas clearly show how individual components are assembled. FIG. 6 shows a complete assembly.

FIG. 7 is a perspective view of an exemplary embodiment of a mount plate. The mount plate in FIG. 7 serves as a surface to which other things may be attached and secured in place. In metal, it is welded to the chassis. In plastic, it is cast, molded, or machined as part of the chassis (see e.g., FIG. 17). It is a receipt point to which the inter-module coupling, lift lug, end cap, eyehook, or other attachment may be attached.

Figure 8:
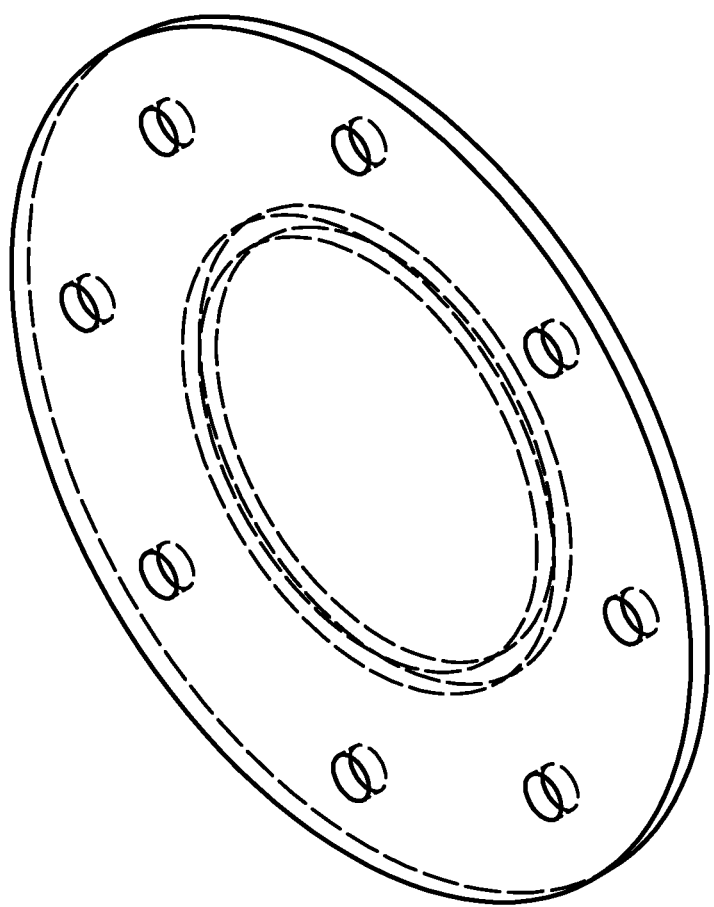
FIG. 8 is a perspective view of an exemplary embodiment of an outer chassis.

FIG. 8 is a perspective view of an exemplary embodiment of an outer chassis. The chassis in FIG. 8 is a machined metal disc that surrounds and encloses the seal element and hub to provide a tight seal between surfaces. The raise lip or edge on the chassis (see e.g., FIG. 8) serves to support the mount hub (see e.g., FIG. 17) and strengthen the chassis interconnection when coupled. The raised lip or edge also serves to hold the two pieces in position while being heated and welded.

The chassis can be manufactured from steel with varying thicknesses and holes.

The chassis can also be manufactured from plastic with varying hardness, thickness, and holes.

Figure 9:
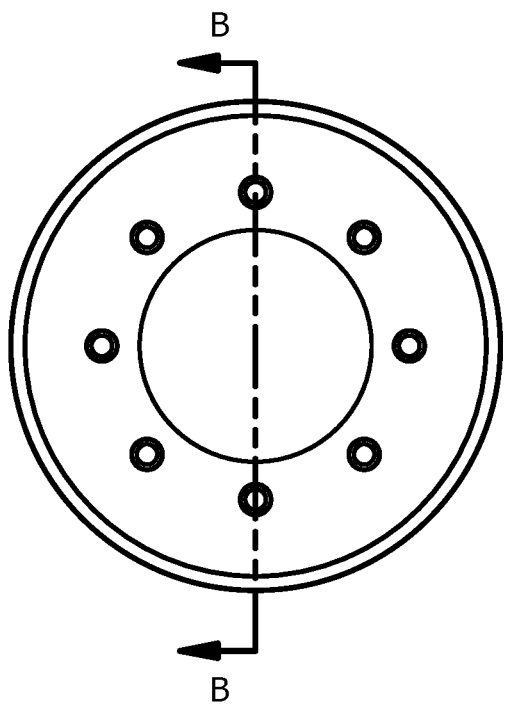
FIG. 9 is an end view of an exemplary embodiment of a seal element.

FIG. 9 is an end view of an exemplary embodiment of a seal element.

Figure 10:
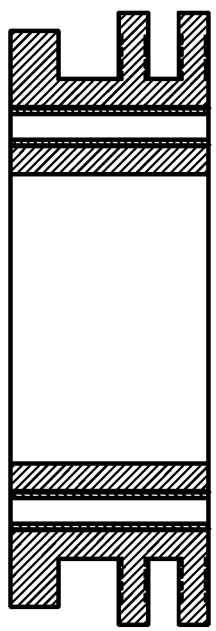
FIG. 10 is a section B-B of the end view of FIG. 9.

FIG. 10 is a section B-B of the end view of FIG. 9.

Figure 11:
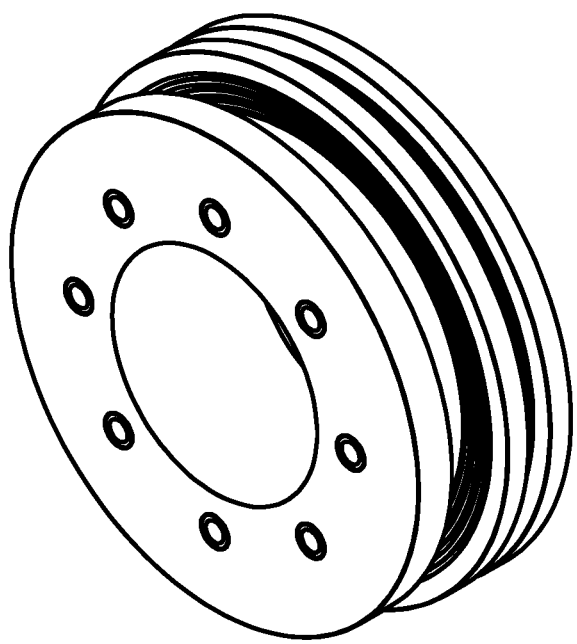
FIG. 11 is a perspective view of an exemplary embodiment of improved material efficiency in a seal element.

FIG. 11 is a perspective view of an exemplary embodiment of improved material efficiency in a seal element. The seal element in FIG. 11 comprises one guide disc, two sealing discs, and four spacer discs. The seal element is an interchangeable object made of easily manipulated material with a distinctive shape and footprint that touches the inner surface of a pipe. Such seal elements are relatively easy to install, handle, and replace.

Figure 12:
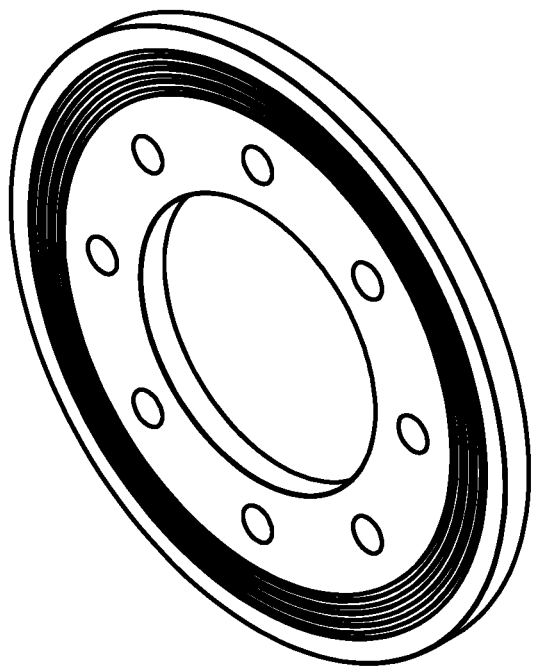
FIG. 12 is a perspective view of an exemplary embodiment of an annular polyurethane elastomer sealing element mount hub with improved material efficiency.

FIG. 12 is a perspective view of an exemplary embodiment of an annular polyurethane elastomer sealing element with improved material efficiency. In other embodiments, the sealing element can comprise high density polyethylene or like material. The seal has an outer circumferential pipe-engaging portion and a plurality of uniquely spaced circumferential lip portions that protrude in a transverse plane perpendicular to the longitudinal axis of the pipeline pig to which the sealing element is attached. The lip portions being separate and flexible with respect to each other, and spaced apart to have sufficient elasticity to deflect when a pipe wall variance is encountered and return to its original shape when contraction, dilation, or distortion force is released.

The integral lip portions include at least two circumferential spaced apart lips that are separately flexible with respect to each other. The width or thickness of the lips may be ¼" and the width of grooves may be about ¼".

The depth of grooves is selected to be sufficient to provide adequate deformation and elasticity for the disc to deflect and return to its original shape when contraction, dilation, or distortion force is released from the outer pipe engaging portion of the disc.

Figure 13:
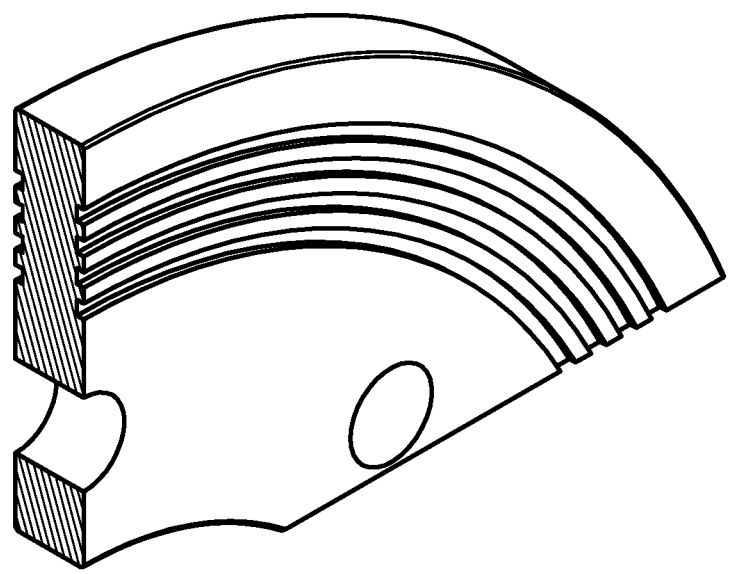
FIG. 13 is a perspective cut away view of an exemplary embodiment of an annular polyurethane elastomer seal element with improved material efficiency.

FIG. 13 is a perspective cut away view of an exemplary embodiment of an annular polyurethane elastomer seal element with improved material efficiency and with circumferential spaced lips. The seal element can be plastic, solid, and/or open.

Figure 14:
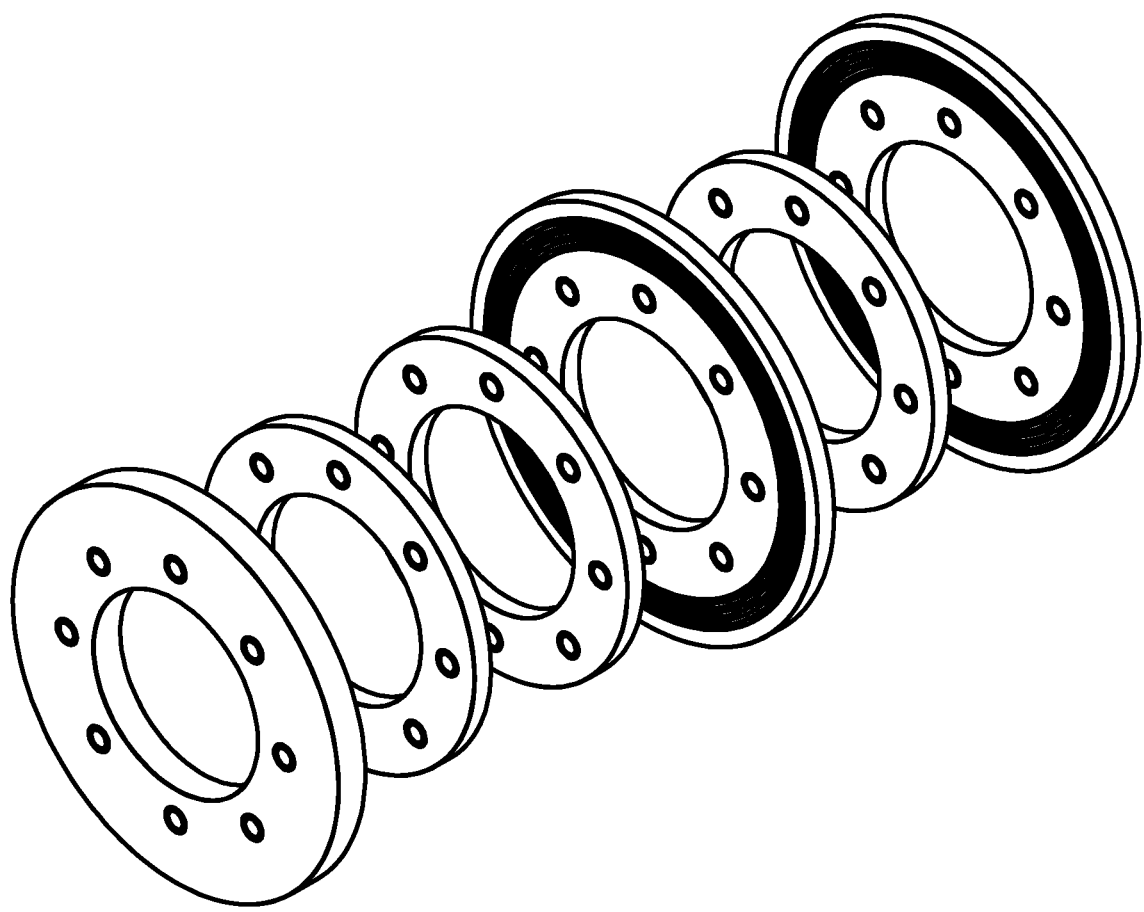
FIG. 14 is a perspective exploded view of an exemplary embodiment of a modular elastomer sealing system with improved material efficiency.

FIG. 14 is a perspective exploded view of an exemplary embodiment of a modular elastomer sealing system with improved material efficiency, which comprises one guide disc, two sealing discs, and four spacer discs. In alternate configurations, the seal assembly can comprise any combination of disc in its configuration.

Figure 15:
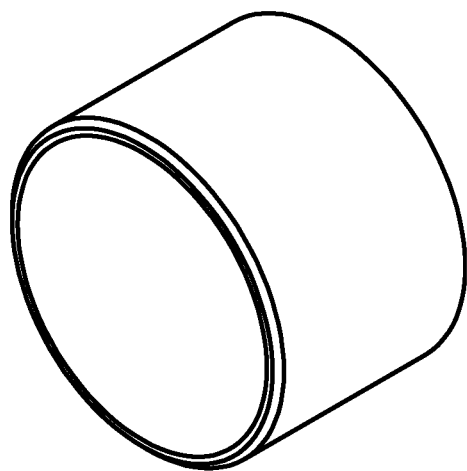
FIG. 15 is a perspective view of an exemplary embodiment of a cylindrical hub.
Figure 17:
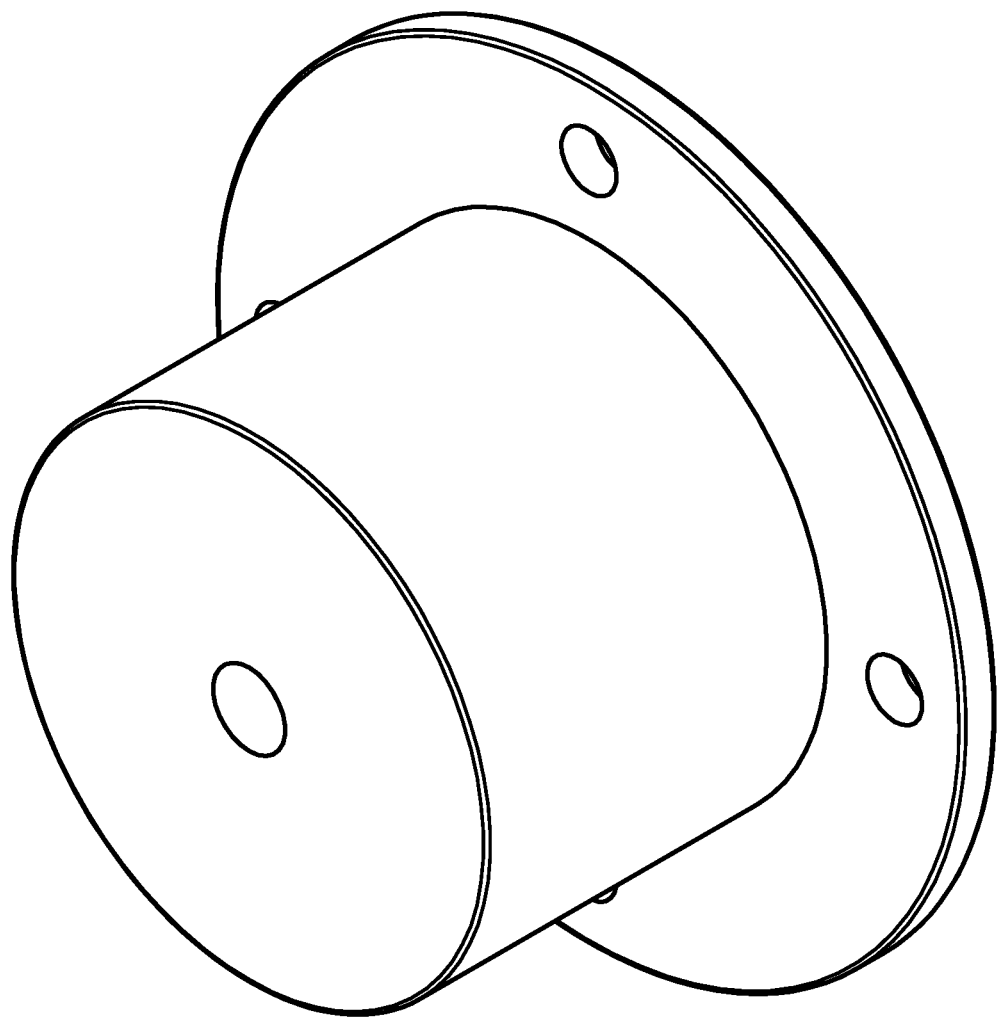
FIG. 17 is a perspective view of an exemplary embodiment of a cylindrical hub and chassis.

In certain exemplary embodiments, the independent parts of the modular seal system can have a central opening capable of being used as a guide to mount and dismount the seal assembly to and from the surface of the mount hub body (see e.g., the mount hub of FIG. 15, and the mount hub of FIG. 17). The mount hub can comprise metal and/or plastic. The metal hub can be substantially solid or can define a cavity of a selected size.

In alternate embodiments, the cross-sectional profile of the central opening may be a variety of shapes.

FIG. 15 is a perspective view of an exemplary embodiment of a cylindrical hub, which can be constructed of metal. The mount hub in FIG. 15 is a resident point of interconnection that serves to mount and dismount the seal assembly that define the bidirectional or unidirectional platform to and from the module. The seal assembly can be a solid cast interchangeable object or a modular seal system of individual parts configured out of easily manipulated material with a distinctive shape and footprint that touches the inner surface of a pipe. Such seal assemblies are relatively easy to install, handle, and replace.

Figure 16:
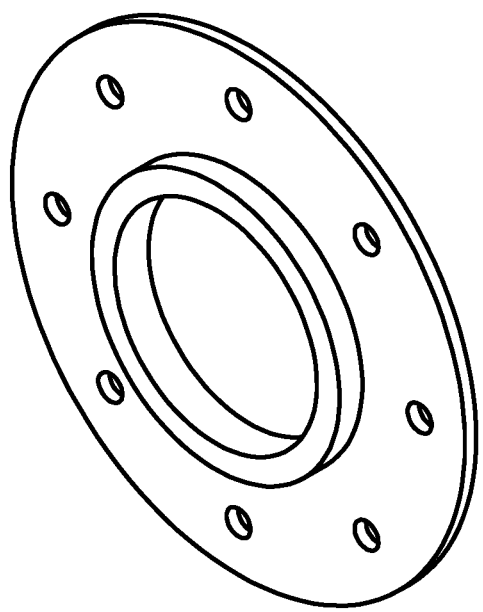
FIG. 16 is a perspective view of an exemplary embodiment of a chassis.

FIG. 16 is a perspective view of an exemplary embodiment of a chassis, which can comprise a substantially rigid first chassis flange constructed of metal. The raised lip or edge (see e.g., FIG. 16) serves support and hold the mount hub (see e.g., the hub in FIG. 15) in position while being heated and welded. The central opening reduces weight; and permits the use of electronics (e.g., transmitter) being housed in the module assembly. In practice, the first chassis flange can also be a solid disc without a central opening.

FIG. 17 is a perspective view of an exemplary embodiment of a cylindrical hub and chassis, which can comprise a plastic module mount hub with a substantially circular shaped body and chassis. This cross-sectional profile may be a variety of shapes. In this example, the hub has a circular cross section.

The plastic module can be divided into components comprising:
  a first chassis flange;
  a mount hub cast as part of the first chassis flange;
  a resilient seal assembly coupled to the mount hub;
  a second chassis flange constructed to couple and position the mount hub and resilient seal assembly between the first and second chassis flanges, and chassis apertures in the chassis flanges that allow the module to be assembled with bolts.

The plastic mount hub is formed as a plastic injection or machined component. Preferably the plastic material used for the mount hub body is constructed of Ultra High Molecular Weight (UHMW) polyethylene material.

Figure 18:
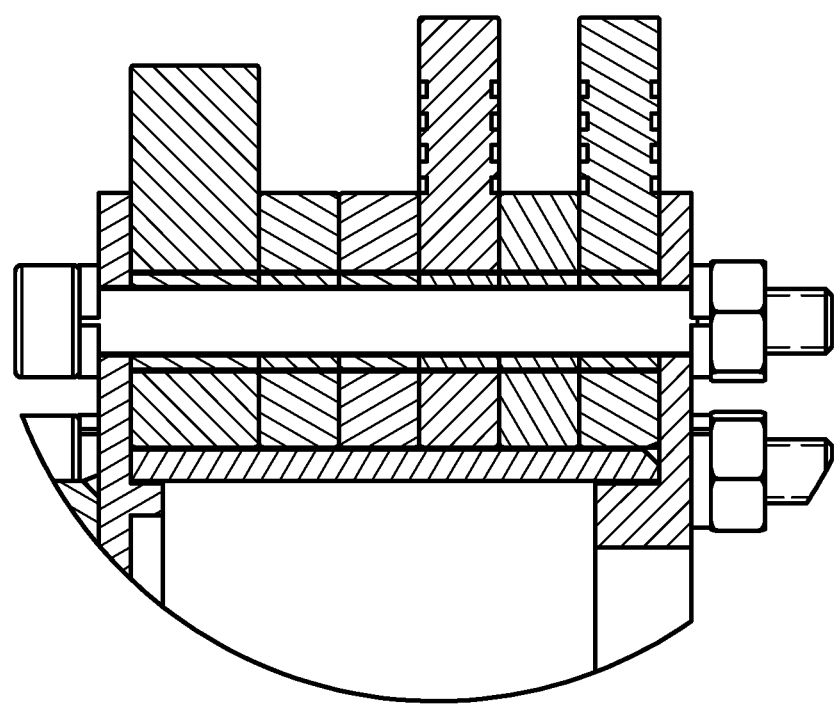
FIG. 18 is a perspective cut away view of an exemplary embodiment of a modular pipe pig attachment scheme.
Figure 19:
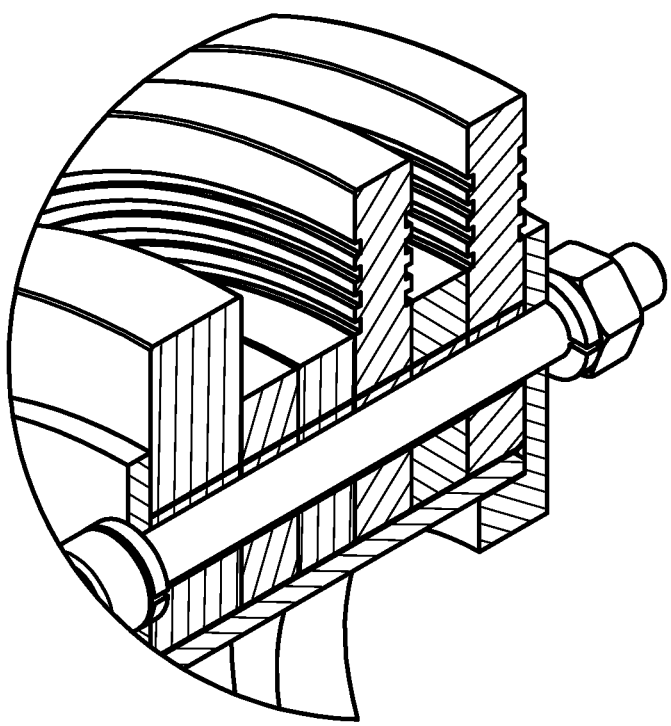
FIG. 19 is a perspective cut away view of an exemplary embodiment of a modular pipe pig attachment scheme.

FIG. 18 is a perspective cut away view of an exemplary embodiment of a modular pipe pig attachment scheme. FIG. 18 is a perspective cut away view of an exemplary embodiment of a pipe pig 1000. Several potential connection techniques can be used on the platform. The connection technique shown FIG. 19 uses a through bolt to secure the seal element in place. Certain exemplary embodiments provide a relatively economical and practical choice for production models.

Figure 20:
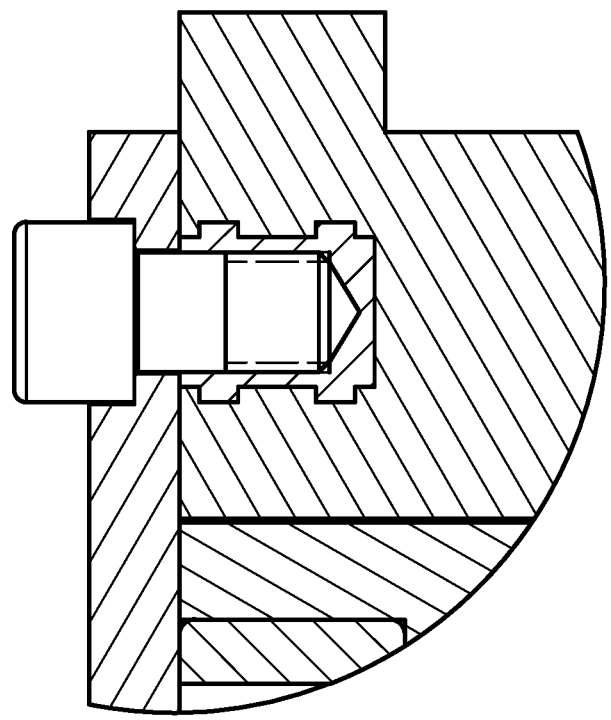
FIG. 20 is a perspective cut away view of an exemplary embodiment of a modular pipe pig attachment scheme.
Figure 21:
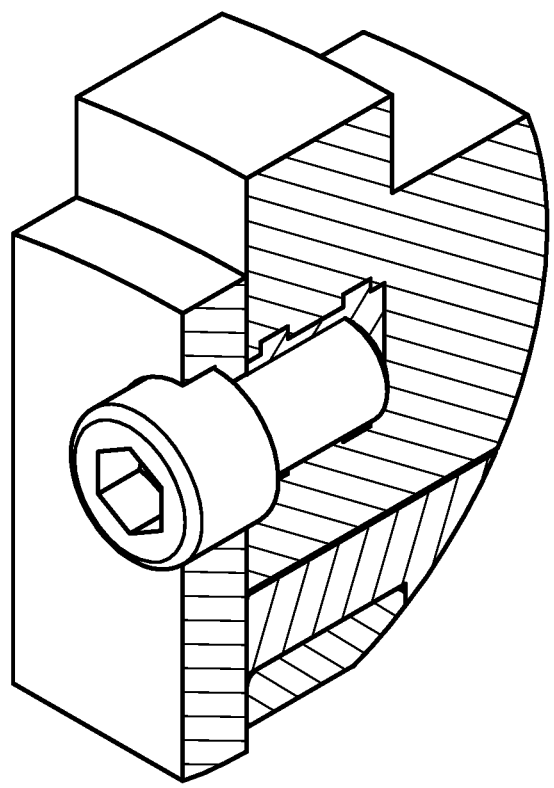
FIG. 21 is a perspective cut away view of an exemplary embodiment of a modular pipe pig attachment scheme.

FIG. 20 is a perspective cut away view of an exemplary embodiment of a modular pipe pig attachment scheme. FIG. 21 is a perspective cut away view of an exemplary embodiment of a modular pipe pig attachment scheme. This connection technique uses a hex head bolt threaded through the chassis into a mold-in threaded insert embedded in the seal element.

Figure 22:
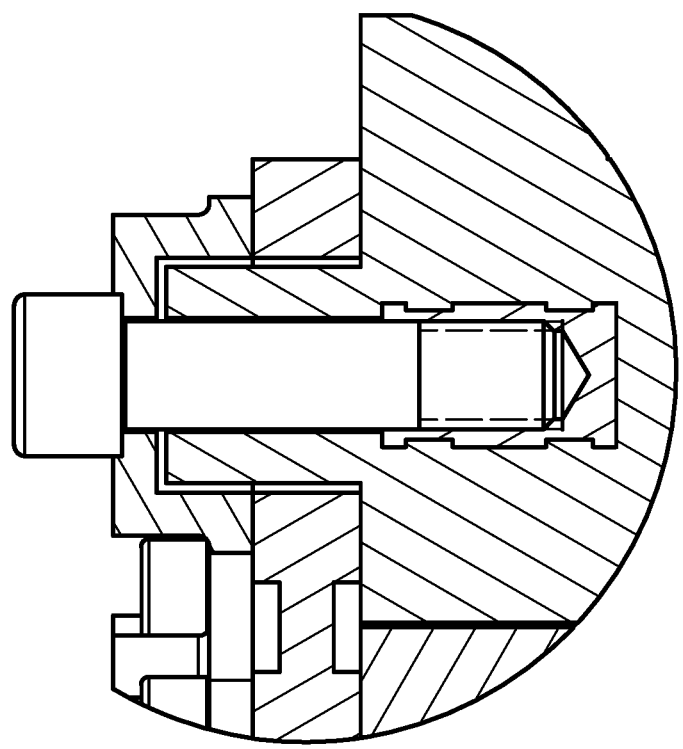
FIG. 22 is a perspective cut away view of an exemplary embodiment of a modular pipe pig attachment scheme.
Figure 23:
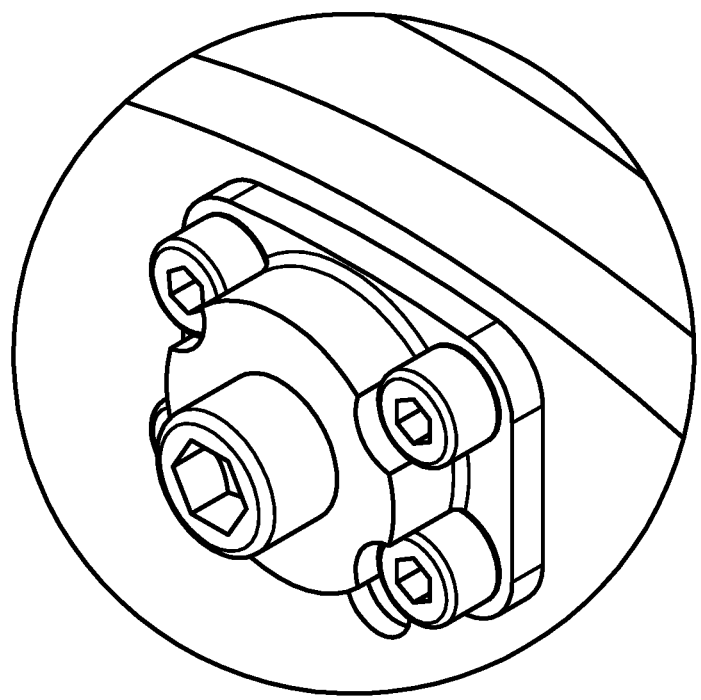
FIG. 23 is a perspective view of a portion of an exemplary embodiment of a modular pipe pig attachment scheme.

FIG. 22 is a perspective cut away view of an exemplary embodiment of a modular pipe pig attachment scheme. FIG. 23 is a perspective view of a portion of an exemplary embodiment of a modular pipe pig attachment scheme. This connection technique uses a hex head bolt threaded into a mold-in threaded insert embedded in the seal element. The housing attached to the chassis provides additional strength to prevent tear out given an anchor lug fasten in this manner would function as a spring.

Figure 24:
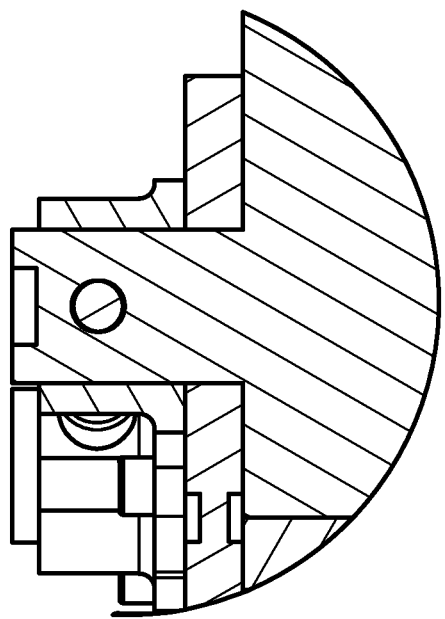
FIG. 24 is a perspective cut away view of an exemplary embodiment of a modular pipe pig attachment scheme.
Figure 25:
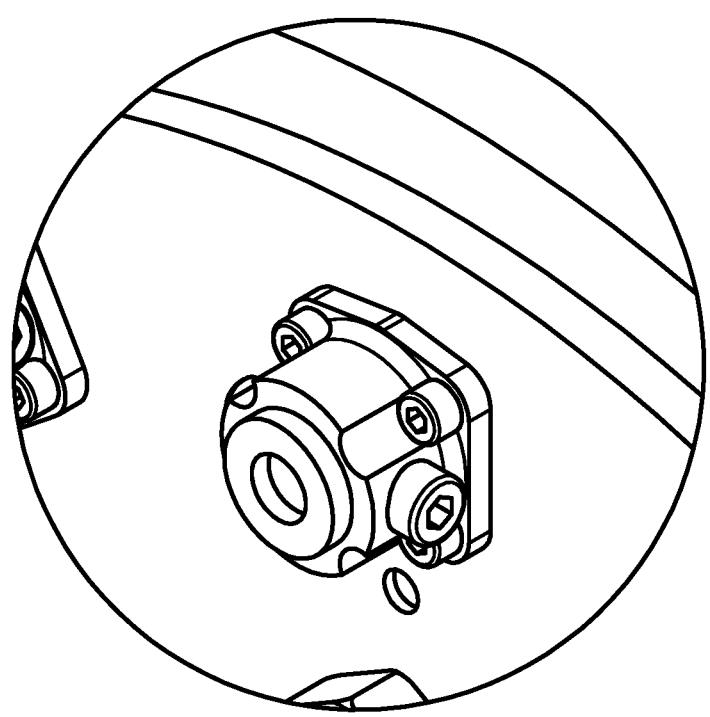
FIG. 25 is a perspective view of a portion of an exemplary embodiment of a modular pipe pig attachment scheme.

FIG. 24 is a perspective cut away view of an exemplary embodiment of a modular pipe pig attachment scheme. FIG. 25 is a perspective view of a portion of an exemplary embodiment of a modular pipe pig attachment scheme. This connection technique uses a cast housing and keeper, which is fastened through an anchor lug to secure the seal element in place. The housing attached to the chassis provides additional strength to prevent tear out given an anchor lug fasten in this manner would function as a spring.

Figure 26:
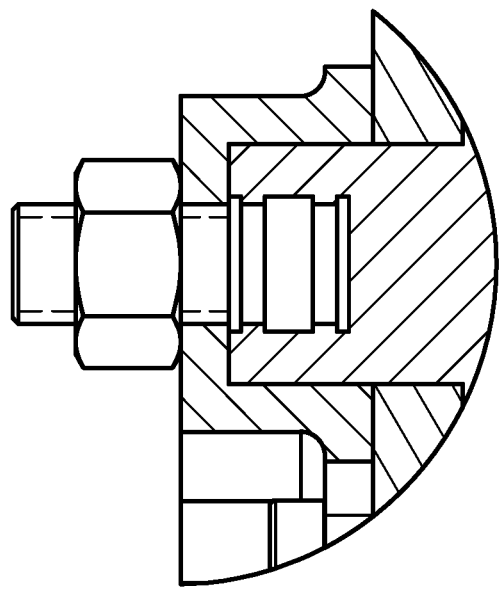
FIG. 26 is a perspective cut away view of an exemplary embodiment of a modular pipe pig attachment scheme.
Figure 27:
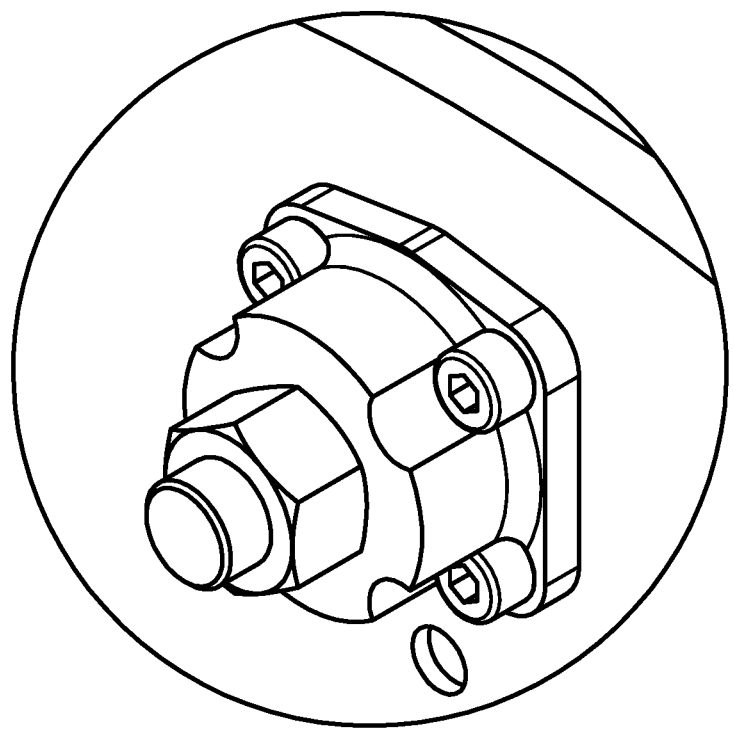
FIG. 27 is a perspective view of a portion of an exemplary embodiment of a modular pipe pig attachment scheme.

FIG. 26 is a perspective cut away view of an exemplary embodiment of a modular pipe pig attachment scheme. FIG. 27 is a perspective view of a portion of an exemplary embodiment of a modular pipe pig attachment scheme. This connection technique uses a cast housing and mold in threaded bolt with a fastening nut to secure the seal element in place.

Figure 28:
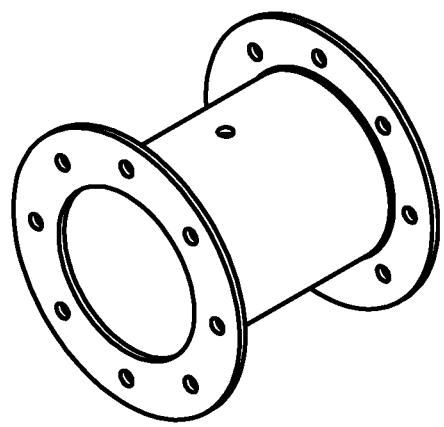
FIG. 28 is a perspective view of an exemplary embodiment of a large diameter pipe mandrel.
Figure 29:
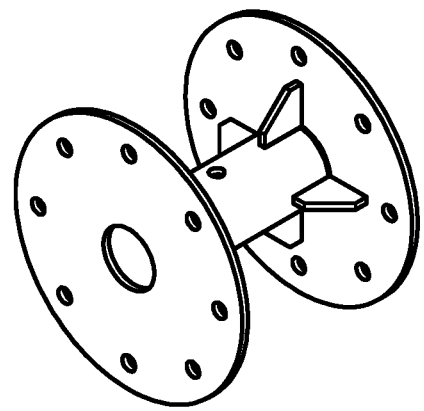
FIG. 29 is a perspective view of an exemplary embodiment of a small diameter pipe mandrel.
Figure 30:
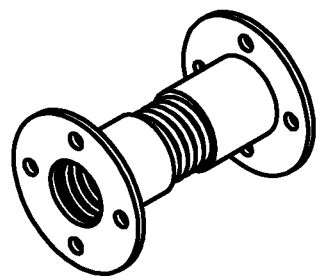
FIG. 30 is a perspective view of an exemplary embodiment of a flexible pipe mandrel.

FIG. 28 is a perspective view of an exemplary embodiment of a large diameter pipe mandrel. FIG. 29 is a perspective view of an exemplary embodiment of a small diameter pipe mandrel. FIG. 30 is a perspective view of an exemplary embodiment of a flexible pipe mandrel. The inter-module coupling systems shown in FIG. 28, FIG. 29, and FIG. 30 showcase the versatility of the platform. The system is designed to be an individual subsystem independent of the module. The coupling system shown in FIG. 28 is coupled using the outer bolt connections that secure the seal element in place. The coupling systems in FIG. 29 and FIG. 30 are coupled using connections on the mount plate.

Figure 32:
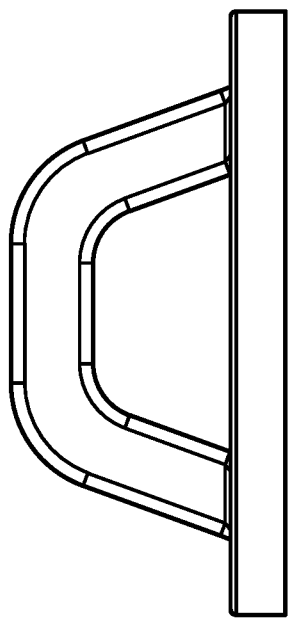
FIG. 32 is a perspective view of an exemplary embodiment of a lift lug.

FIG. 31 is a perspective view of an exemplary embodiment of a unidirectional modular pipe pigging platform. FIG. 31 is unidirectional train platform that can comprise three or more modules. Certain exemplary embodiments can be readily equipped to function for a variety of tasks by simply changing the seal element design. The inter-module coupling system has a flexible center so the platform is better equipped to negotiate bends FIG. 32 is a perspective view of an exemplary embodiment of a lift lug. FIG. 33 is a perspective view of an exemplary embodiment of a lift lug. The lift lug is a handle or projection used as a hold or support for transportation and lifting purposes.

FIG. 34 is a perspective view of an exemplary embodiment of an improved polyurethane elastomer sealing element having a partially spherical shape. FIG. 35 is a perspective view of an exemplary embodiment of an improved polyurethane elastomer partially spherical sealing element. The sphere having a rigid body being compressible and expandable to provide sufficient seal in the pipeline permitting the pig to travel at the speed of the pipeline fluid or gas.

The partially spherical sealing element can comprise elastomers (e.g., polyurethane, neoprene, nitrile, and/or Viton, etc.) or other deformable resilient material with predetermined elasticity permitting the body to deflect inward along its transverse plane perpendicular to the longitudinal axis as the pig negotiates pipe wall variances through the pipeline.

The partially spherical sealing element can have a leading part in the shape of a paraboloid or hemisphere with an increasing slope to the trailing part also having an outer circumferential pipe-engaging portion with a plurality of uniquely spaced circumferential cavities that recede along the longitudinal axis of the pipeline pig to which the sphere is attached (see e.g., the cavities of FIG. 35).

The integral cavities can have at least one circumferential row of spaced apart cavities along the vertical axis. The cavities can have sufficient elasticity to deflect inward when a pipe wall variance is encountered and return to its original shape when contraction, dilation, or distortion force is released.

The cavities also being supported with vertical spars (see e.g., the vertical spars of FIG. 35) fanning outwardly and positioned at various distances from each other along the vertical axis perpendicular to the longitudinal axis. The spars providing strengthening qualities that allow the cavities to deflect and return to its original shape when contraction, dilation, or distortion force is released from the outer pipe engaging portion of the sphere.

Definitions

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.

accessory—a device and/or object that enhances a function of a system.

activity—an action, act, step, and/or process or portion thereof adapter—a device used to effect operative compatibility between different parts of one or more pieces of an apparatus or system.

align—to arrange something to have a longitudinal axis that is substantially parallel to a longitudinal axis of a pipe.

anchor lug—a projected piece of a sealing element via which a sealing element is coupled, supported, and held in place, each anchor lug engages with a cavity of a plurality of cavities defined by a chassis. When engaged with the cavity, the anchor leg projects past a face of the chassis, which provides a circumferential strengthening means.

and/or—either in conjunction with or in alternative to.

annular—having substantially a ring-shape having an inside diameter and an outside diameter anterior—a first portion to arrive at a given location as an object travels through a pipe.

aperture—an opening.

apparatus—an appliance or device for a particular purpose.

assemble—to fit parts together that comprise a pig.

assist—to support and/or aid.

associate—to join, connect together, and/or relate.

attachment—a pipe pig component that is placed on an end of the pipe pig to perform a particular function (e.g., cutting through blockages, act a shield for sensors internal to the pipe pig, etc.).

battery—a device and/or system that comprises one or more cells, in which chemical energy is converted into electricity that is used as a source of power.

battery pack—a group of two or more batteries housed within a casing and used as a power source.

bidirectional—constructed to move or operate in either of two opposing directions in a pipe.

blockage—an obstruction in a pipe.

body—a main part of an object.

brush—hard wire bristles that encircle an anterior or posterior sealing element.

can—is capable of, in at least some embodiments.

cap—a cover of a system.

cast—formed and/or shaped by being poured it into a mold while in a liquid and/or plastic state.

cavity—a hollow space defined by an object.

channel—a passage that is substantially surrounded by material.

chassis—a component that couples a sealing ring to a hub in a pipe pigging system.

circumferential—about a shape that is generally circular.

clean—to remove something that is not desired.

comprising—including but not limited to.

configure—to make suitable or fit for a specific use or situation.

conform—to change to be substantially the same shape as something.

connect—to join or fasten together.

constructed to—made to and/or designed to.

convert—to transform, adapt, and/or change.

core—a central portion of a device and/or system.

core hole—an aperture defined by a central portion of a device and/or system.

coupleable—capable of being joined, connected, and/or linked together.

coupling—linking in some fashion.

cup—a conical bowl shape that defines a portion of an anterior or posterior sealing element. Sealing elements are so shaped so that the outer diameter is sized to substantially fill a pipe's interior cross section.

cut—to divide, crop, and/or shape via a sharp instrument.

define—to establish the outline, form, or structure of deflect—to bend.

deform—to change shape and characterized as having a Durometer hardness between approximately 60 and approximately 85 on the Shore A hardness scale.

determine—to obtain, calculate, decide, deduce, and/or ascertain.

device—a machine, manufacture, and/or collection thereof.

direct contact—having a surface of one object substantially adjacent to a corresponding surface of another object.

edge—a border of an object.

elastomers—natural or synthetic polymers having elastic properties e.g., polyurethane, neoprene, and nitrile.

electric motor—a machine that converts electrical energy into mechanical energy.

element—a component.

end cap—a molded object with a distinctive shape and size that is coupleable to a mount plate and has a surface that is an external surface of a pipe pig.

enter—to penetrate.

face—a surface of an object.

fastener—a hardware device that mechanically joins or affixes two or more objects together.

flange—a rib or rim that can be used for strength, guiding, or for attachment to another object.

flow—movement of a liquid and/or gas from one location to another.

fluid—a liquid and/or gas.

form—to construct.

frame—a rigid structure that surrounds or encloses something such as a mold.

fuel cell—a device and/or system that produces an electric current directly from a chemical reaction.

groove—a narrow cut or depression to guide motion, especially deflection on a sealing disc.

guide disc—a resilient elastomer annular sealing element sized so its outer surface is the approximate size of the internal pipe wall.

house—to substantially surround.

housing—an object that at least partially surrounds something.

impervious—not allowing penetration of something.

information—a distinct piece of data, usually formatted in a special or predetermined way and/or organized to express concepts.

information device—any device capable of processing data and/or information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general, any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

install—to connect or set in position and prepare for use.

interior—an inside portion of.

keeper—a component that, when coupled to a system, restrains motion of other components of a system.

lay—to be positioned on a surface of an object to rest.

length—a longest dimension of an object when the object is fully laid out.

lateral groove—a long narrow cut or depression on each side of a mount hub that is constructed to receive a corresponding ridge of a chassis.

lift—to raise relative to the surface of the earth.

lift lug—a handle or projection used as a hold or support for transportation and lifting purposes.

liquid—a nearly incompressible fluid that conforms to the shape of its container but retains a substantially constant volume independent of pressure.

mandrel—a central part of a pig assembly that comprises a hollow metal body, a solid center rod, or other rigid shaft fitted with two flanged ends to which a front and rear-mount hub are attached.

material—a substance comprised by something.

mating surface—an object exterior portion that engages with a corresponding surface of another object.

may—is allowed and/or permitted to, in at least some embodiments.

measuring instrument—a sensor that measures a value in a pipeline.

method—a process, procedure, and/or collection of related activities for accomplishing something.

modular—constructed out of prefabricated units with standardized dimensions.

module—each of a set of standardized parts or independent units that can be used to construct a pipeline pip pigging system.

mold—to form with a distinctive shape with an easily manipulated material.

mold-in threaded insert—a formed object that is threaded for receiving a threaded fastener, wherein the object is constructed to be placed in a cavity defined by another object.

mount hub—a central component that serves to couple components that define the pig assembly (e.g., chassis components). The mount hub defines a lateral groove on each side that receives a corresponding ridge from each chassis.

mount plate—a solid piece of material that has enough strength and sturdiness to serve as a surface to which other things are attached and secured.

obstruction—something that blocks a pipeline.

penetrate—to pass through something.

pipe pig—a system constructed to perform one or more pipeline maintenance operations (e.g., cleaning and/or inspecting the pipeline), which pipeline maintenance operations can be performed with or without stopping flow through the pipeline. Certain pigs are constructed to be used unidirectionally. Other pigs are constructed to be used bidirectionally.

pipe—a tube that is constructed to transport liquids and/or gases.

pipeline—a conduit that comprises pipes connected end-to-end that transports fluid or gas.

place—to position something in a location.

plate—a component having at least one substantially planar surface.

platform assembly—a portion of a pig that comprises (i) a mandrel comprising body flanges, which are coupled to a front mount hub and a second mount hub via a first plurality of fasteners; (ii) a two piece chassis assembly that is held in place via lateral grooves and secured in place to at least one of the mount hubs via a second plurality of fasteners; and (iii) a sealing element that is aligned and held in place via anchor lugs embedded in cavities defined by the chassis.

plurality—the state of being plural and/or more than one.

posterior—a last portion to arrive at a given location as an object travels through a pipe.

predetermined—established in advance.

prevent—to substantially stop something from happening.

provide—to furnish, supply, give, and/or make available.

proximity—near to.

raised region—a portion of a sealing element that is approximately that of a pipe through which a pipe pig traverses.

receive—to get as a signal, take, acquire, and/or obtain.

remove—to get rid of something.

restrain—to control motion of something.

reversible—capable in of being directionally reversed and continue to functionally perform.

rib—a raised portion on a sealing element that touches the inside surface of a pipe.

rigid—having a greater stiffness than and a Durometer hardness that is greater than 85 on the Shore A hardness scale.

roller—a wheel.

rotate—to turn around an axis.

seal—to make substantially impervious to fluid entry.

seal assembly—a plurality cylindrical objects of potentially different diameters, the seal assembly comprises a plurality of components that comprise guide discs, sealing discs, and spacer discs; the components can be cast individually or collectively to form the seal assembly.

seal disc or sealing disc—a resilient elastomer annular sealing element sized so its outer surface remains tightly fit to an internal pipe wall.

sealing element—a resilient object configured out of malleable material having a shape and footprint that touches an inner surface of a pipe through which a pig travels.

set—a related plurality.

shape—a sectional contour.

sized and shaped—having a particular dimension and cross-sectional profile.

sleeve—a tubular pin.

spacer disc—a elastomer object that fills space between objects.

spar—a structural component on a vertical axis of a trailing part of a pigging sphere as the pigging sphere traverses a pipeline.

sphere—an elastomer sealing element having a ball, spherical, paraboloid or hemispherical shape.

substantially—to a great extent or degree.

support—to bear the weight of, especially from below.

support ring—an annular component that is coupled inside via a cavity defined by a sealing element (which sealing element can be symmetrical). In some embodiments, the support ring can be coupled to the sealing via a plurality of fasteners on a mount hub (which mount hub can be symmetrical). In other embodiments, the support ring can be integrally molded with the sealing element.

surface—an outermost layer of something.

symmetrical—having a substantially similar appearance when rotated one hundred and eighty degrees.

system—a collection of mechanisms, devices, machines, articles of manufacture, processes, data, and/or instructions, the collection designed to perform one or more specific functions.

threaded—comprising ridges machined into a cylinder or cone in the form of a helix that allow coupling via opposing corresponding ridges.

tightly fit—assembled with surfaces substantially in contact with one another.

transmit—to send as a signal, provide, furnish, and/or supply.

traverse—to travel from a first location to a second location.

unidirectional—constructed to move or operate in a single direction in a pipe.

unitary—one-pieced.

user—a person employing a device and/or system.

via—by way of and/or utilizing.

wear ring—a mark on a surface or color infused layer embedded on ribs (or raised regions) of a sealing element, which is used to indicate wear and replacement.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

no characteristic, function, activity, or element is "essential";

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed:

1. A modular pipeline pigging system comprising:
    a modular pipe pig, the modular pipe pig comprising:
        a modular seal system;
        a mandrel;
        a front module; and
        a rear module;
    wherein, at least one of the front module and the rear module comprises:
        a chassis defining a plurality of chassis apertures;
        a first chassis flange;
        a mount hub mounted to the face of the first chassis flange;
        the seal assembly coupled to the mount hub, the seal assembly coupled to the chassis via a plurality of anchor lugs that function as springs;
        a second chassis flange constructed to:
            couple and position the mount hub and seal assembly between the first and second chassis flanges; and
            when coupled to the first chassis flange, through chassis apertures and seal assembly apertures, substantially covers a face of the seal assembly and the mount hub.

2. The modular pipeline pigging system of claim 1, wherein:
    the seal assembly is coupled to the chassis via one or more bolts into a mold-in threaded insert.

3. The modular pipeline pigging system of claim 1, wherein:
    the seal assembly is coupled to the chassis via a cast housing and keeper.

4. The modular pipeline pigging system of claim 1, wherein:
    the seal assembly is coupled to the chassis via one or more bolts and nuts.

5. The modular pipeline pigging system of claim 1, wherein:
    the seal assembly is coupled to the chassis via one or more anchor lugs, bolts, nuts, or keepers.

6. The modular pipeline pigging system of claim 1, further comprising:
    the seal assembly is solid cast and comprises a guide disc, a seal disc, and a spacer disc.

7. The modular pipeline pigging system of claim 1, wherein:
    one of the front module and the rear module comprises a single guide disc.

8. The modular pipeline pigging system of claim 1, wherein:
    one of the front module or rear module comprise more than one of a guide disc, a seal disc, and a spacer disc.

9. The modular pipeline pigging system of claim 1, wherein:
    the mount hub provides a surface that substantially supports and strengthens a central opening of the seal assembly.

10. The modular pipeline pigging system of claim 1, wherein:
    the mandrel comprises a first flange and a second flange, the first flange coupleable to a front module chassis, the second flange coupleable to a rear module chassis.

11. The modular pipeline pigging system of claim 1, further comprising:

a mount plate constructed to couple the front module or the rear module to the mandrel, the mount plate is a machined disc that defines mount plate apertures, the mount plate being coupleable to the chassis by welding or by other means such as via fasteners that pass through the mount plate apertures.

12. The modular pipeline pigging system of claim 1, wherein:

a lift lug coupled to the mount plate, wherein the pipe pig is liftable via the lift lug.

13. The modular pipeline pigging system of claim 1, wherein:

the mandrel comprises a first flange and a second flange, the first flange of the mandrel coupleable to a mount plate of the front module, the second flange coupleable to a mount plate of the rear module.

14. The modular pipeline pigging system of claim 1, wherein:

the mount hub has a substantially circular cross-section.

15. The modular pipeline pigging system of claim 1, wherein:

the seal assembly is solid cast and defines a central opening having a substantially circular shape.

16. The modular pipeline pigging system of claim 1, wherein:

the modular pipe pig is a unidirectional pig.

17. The modular pipeline pigging system of claim 1, wherein:

the modular pipe pig is a bidirectional pig.

18. The modular pipeline pigging system of claim 1, wherein:

the modular sealing assembly has individual parts comprising a plurality of guide disc, seal disc, and spacer disc.

19. The modular pipeline pigging system of claim 1, wherein:

the seal assembly is partially spherical with a smooth outer surface, the seal assembly defining a plurality of radially disposed curved channel segments, each of the plurality of radially disposed curved channel segments separated from an adjacent curved channel segment by a spar, the spar one of a plurality of spars disposed between the a plurality of radially disposed curved channel segments.

\* \* \* \* \*